(12) United States Patent
Pourfilet et al.

(10) Patent No.: US 8,708,029 B2
(45) Date of Patent: Apr. 29, 2014

(54) INJECTION MOLD FOR A WAX MODEL OF A TURBINE BLADE HAVING AN ISOSTATIC CORE HOLDER

(75) Inventors: Patrick Pourfilet, Asnieres sur Seine (FR); Daniel Quach, Fontenay Sous Bois (FR); Jean-Louis Martial Verger, Bondy (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 13/824,754

(22) PCT Filed: Oct. 14, 2011

(86) PCT No.: PCT/FR2011/052410
§ 371 (c)(1),
(2), (4) Date: Mar. 18, 2013

(87) PCT Pub. No.: WO2012/052665
PCT Pub. Date: Apr. 26, 2012

(65) Prior Publication Data
US 2013/0174998 A1    Jul. 11, 2013

(30) Foreign Application Priority Data
Oct. 19, 2010    (FR) .................................... 10 58507

(51) Int. Cl.
*B22C 7/02*        (2006.01)
*B22C 9/04*        (2006.01)
(52) U.S. Cl.
USPC ............................ 164/159; 164/228; 164/235
(58) Field of Classification Search
USPC .......... 164/159, 228, 235, 339, 342, 344, 412
See application file for complete search history.

(56) References Cited

U.S. PATENT DOCUMENTS

| | | | |
|---|---|---|---|
| 4,617,977 A | | 10/1986 | Mills |
| 5,735,335 A | * | 4/1998 | Gilmore et al. ............... 164/516 |
| 6,530,416 B1 | | 3/2003 | Tiemann |
| 6,626,230 B1 | * | 9/2003 | Woodrum et al. ............ 164/516 |
| 7,275,585 B1 | * | 10/2007 | Guerche et al. ............... 164/516 |
| 7,931,459 B2 | * | 4/2011 | Louesdon et al. ............ 425/175 |
| 2011/0204205 A1 | * | 8/2011 | Kamel et al. .................. 249/184 |

FOREIGN PATENT DOCUMENTS

| | | |
|---|---|---|
| DE | 198 21 770 | 4/1999 |
| EP | 0 084 234 | 7/1983 |
| EP | 0 099 215 | 1/1984 |

OTHER PUBLICATIONS

International Search Report Issued Feb. 29, 2012 in PCT/FR11/52410 Filed Oct. 14, 2011.

* cited by examiner

*Primary Examiner* — Kevin P Kerns
(74) *Attorney, Agent, or Firm* — Oblon, Spivak, McClelland, Maier & Neustadt, L.L.P.

(57) ABSTRACT

An injection mold producing a model of a turbine engine blade, including: a top surface that folds onto a bottom surface, both surfaces including long rods for supporting a core generating cooling cavities inside the blade, wherein the long rods of the bottom surface are configured to contact a first surface of the airfoil at bearing points, and the long rods of the top surface are configured to contact a second surface of the airfoil at clamping points; at least one short rod extending from one of the surfaces of the mold and pointing towards a false point located on one of the surfaces of the airfoil, the length of the short rod being shorter than the distance between the surface of the mold and the surface of the blade at the false point, and the difference between the length and the distance being equal to tolerance in relation to positioning of the false point in event of deformation of the core.

10 Claims, 3 Drawing Sheets

INJECTION MOLD FOR A WAX MODEL OF A TURBINE BLADE HAVING AN ISOSTATIC CORE HOLDER

The field of the present invention is that of the manufacture of parts for turbine engines and, in particular, that of the manufacture of the turbine blades thereof by a so-called lost wax casting technique.

The lost wax casting technique firstly consists in producing a model, made of wax or any other material which is able to be easily removed afterwards, of the part to be produced; said model comprises an internal part forming a ceramic core which represents the desired cavities to appear inside the blade assembly. The wax model is then immersed several times in slurries consisting of a suspension of ceramic particles to produce, by so-called stucco-coating and drying operations, a mold shell.

Then the wax is removed from the mold shell which is an operation by which the wax or the material forming the original model is removed from the shell. After this removal process a ceramic mold is obtained, the cavity thereof reproducing all the shapes of the blade and still enclosing the ceramic core designed to generate the internal cavities thereof. The mold is then subjected to a thermal treatment at high temperature or "firing" which provides it with the required mechanical properties.

The mold shell is now ready for the manufacture of the metal part by casting. After checking the internal and external integrity of the mold shell, the following step consists in casting a molten metal which fills the spaces between the internal wall of the mold shell and the core, and solidifying said metal. In the field of lost wax casting, currently a plurality of solidification techniques are differentiated, i.e. a plurality of casting techniques, depending on the nature of the alloy and the expected properties of the part resulting from the casting. This may be columnar structure directional solidification (DS), single-crystal structure directional solidification (SX) or equiaxis solidification (EX).

After the casting of the alloy, the shell is broken by a knocking-out operation. During a further step, the ceramic core which remains enclosed in the resulting blade is chemically removed. The resulting metal blade is then subjected to finishing operations which permit the finished part to be obtained.

Examples of producing turbine blades by the lost wax casting technique are provided by the applicant in the patent applications FR2875425 and FR2874186.

To form the wax model of the blade, a tool or wax injection mold is used, in which the core is placed, and then the liquid wax is injected via a channel provided to this end.

It is necessary to place this core extremely accurately in the injection-mold as any shifting of the positioning thereof is manifested by non-uniformities in the thickness of the walls of the blade. As the metal of the blade is subjected to very high temperatures, these faults will be manifested as a considerably reduced service life of the blade. It is thus necessary to ensure the position occupied by the core in the mold with a high degree of accuracy. To achieve this, the molds currently used comprise small vertical rods which support the core. Bearing points on one face of the core (suction face or pressure face) correspond to said rods, which constitute a reference for the positioning of the core relative to the lower mold cavity. A second series of rods, which correspond spatially to the rods of the aforementioned bearing points, extends from the upper face of the mold to form clamping points on the second face of the core. By being clamped between the rods of the bearing points and those of the clamping points, the core is then correctly and securely positioned in the injection mold.

In current practice, the mold comprises rods on its suction face cavity and pressure face cavity as follows: four rods corresponding to bearing points on the core serve to support the core via the suction face of its aerofoil; they are oriented substantially vertically. The two last bearing points serve as a lateral abutment for the core in the mold; four clamping points on the pressure face of the core correspond to these four bearing points of the suction face opposite the four bearing points of the suction face. One example of the positioning of the bearing points and the clamping points in the prior art is provided in the patent applications EP 1775054, EP 0099215 or GB 2073094; it is also shown in FIGS. 2 and 3.

Whilst the length of the supporting rods and clamping rods is the thickness which is desired for the walls of the blade and will be denoted as long rods in the remainder of the present document, the two faces of the mold also comprise complementary shorter rods, located opposite points on the blade denoted as false points and, as a result, denoted short rods. Said short rods also extend vertically but have a slightly shorter length than that of the rods of the bearing points and clamping points, such that they do not normally come into contact with the (suction face and pressure face) surfaces of the core. The purpose thereof is only to come into contact with the core in case of the deformation thereof and thus create a tolerance envelope around the core. To achieve this, the length thereof extends up to, for example, $5/100$th of a millimeter of the maximum tolerance of the core. It follows that if the core is badly positioned and exceeds said tolerance envelope of $5/100$th of a millimeter, the short rods come into contact with the false points on the surface of the core and either make the closure of the mold impossible or cause the breakage of the core when the injection mold is closed, thus making the injection process impossible. Thus, only cores with dimensions within the tolerance envelope are able to be used for the injection-molding of a wax model. It is preferable that the core breaks at this stage rather than the wax being injected around the core with an incorrect wall thickness of the wax. Maintaining the correct wall thicknesses on the metal part is thus ensured.

The problem encountered with a device for positioning the core as described above is that the core may still be deformed or adopt an incorrect position when positioned and clamped in the wax mold. The core is in fact held and positioned in the region of the four bearing points and the four clamping points, which are preferably positioned in the region of the upper and lower ends of the leading edge and the trailing edge of the aerofoil of the core. However, when positioned and clamped in this manner, the core is braced and may be subjected to positioning stresses and clamping stresses which are too high.

The core, being naturally slightly twisted before its positioning and clamping in the wax injection mold, may be subjected to too much straightening at the bearing and clamping points. It may then break or even lose its given position which is released when the mold is opened. This release of stress may be even greater when removing wax from the wax model in the shell. The variation of the position of the core when removing the wax may thus lead to faults in the thickness of the walls on the metal part after casting.

The object of the present invention is to remedy said drawbacks by proposing a system for positioning a core in an injection mold for a wax model which does not have some of the drawbacks of the prior art and, in particular, which avoids the appearance of stresses in the aerofoil of the core when installed in the mold and when injecting the wax.

To this end, the subject of the invention is an injection mold for producing a model of a turbine engine blade to be produced by the lost wax casting technique, comprising an upper face which folds onto a lower face, the two faces having a footprint reproducing the external shape of the blade to be produced and carrying long rods for supporting a core designed to generate cooling cavities inside the blade, said core having the shape of an aerofoil between a root and a tip, said long rods of the lower face being designed to come into contact with a first face of the aerofoil in the region of bearing points and said long rods of the upper face being designed to come into contact with a second face of said aerofoil in the region of clamping points, each clamping point of the second face being positioned opposite a bearing point of the first face, characterized in that it further comprises at least one short rod extending from one of the faces of the mold and pointing toward a false point positioned on one of the faces of the aerofoil, the length of said short rod being less than the distance between the face of the mold and that of the aerofoil in the region of said false point and the difference between said length and said distance being equal to the tolerance at the position of said false point in the case of deformation of the core.

"Tolerance at the position of a point" is understood as the maximum acceptable deformation at that point. With the specified length for the short rod, it is ensured that if the core comes into contact with the short rod, it would have exceeded fixed tolerances for the deformation of the core and thus interference with the short rod would either result in not being able to close the mold or breakage of the core.

Advantageously, the number of pairs consisting of a rod associated with a bearing point on the first face and a rod associated with a clamping point on the second face of the aerofoil of the core is at most equal to 3. The limitation to three of the number of corresponding bearing points and clamping points on the blade permits the aerofoil of the core to be held without torsional stress or flexural stress on said aerofoil and thus the absence of undesirable movement of the core before or during the injection of wax. In the case of three pairs of rods, an isostatic support of the aerofoil of the core is obtained i.e. without harmful stress.

In a particular embodiment, the pairs of long rods are associated with bearing points on said first face and with clamping points on said second face, positioned for a first pair in the region of the center of the aerofoil, on the trailing edge side, and for the two other pairs in the region of the upper and lower ends of the aerofoil on the leading edge side.

In a further particular embodiment, the pairs of long rods are associated with bearing points on said first face and with clamping points on said second face, positioned for a first pair in the region of the center of the aerofoil on the leading edge side and for the two other pairs in the region of the upper and lower ends of the aerofoil on the trailing edge side.

Preferably, said short rod is positioned longitudinally in the region of one of the bearing points or clamping points of one of the faces of the aerofoil, and laterally on the leading edge side or trailing edge side opposing that on which said bearing point or clamping point is positioned.

More preferably, short rods point toward three false points of the same face, said false points being positioned in a staggered manner relative to the bearing points or clamping points of said face.

Even more preferably, short rods point toward three false points on each of the faces of the aerofoil of the core, said false points being positioned on each face in a staggered manner relative to the bearing points or clamping points.

The staggered arrangement relative to the bearing points and clamping points achieves a more uniform distribution and the ability to control the thickness of the walls of the blade at the points furthest away from one another.

Advantageously, the rods are of cylindrical shape, having ends following the local shape of the core. Thus markings on the surface of the core and local deformations thereof are avoided.

Preferably, the short rods have a greater diameter than that of the long rods.

In a particular embodiment, the short rods have a length which is shorter by $5/100$th of a millimeter than that of the long rods.

The invention will be understood more clearly and further objects, details, features and advantages thereof will appear more clearly during the following detailed explanatory description of an embodiment of the invention provided purely by way of illustrative and non-limiting example, with reference to the accompanying schematic drawings, in which.

Figure 1:
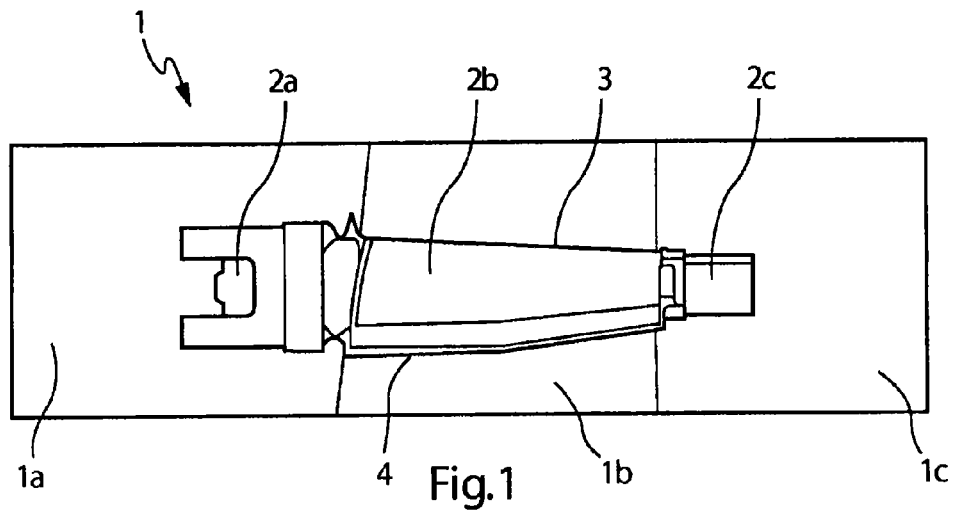
FIG. 1 is a view from above of a core in position on the lower face of a mold, in position before closing the mold and injecting the wax.

The lower surface of an injection-mold 1 forming a footprint for a suction face of a turbine blade is seen with reference to FIG. 1. Arranged on said lower surface, via its suction face, is a ceramic core 2 having substantially the shape of a blade with a root 2*a*, an aerofoil 2*b* extending between a leading edge 3 and a trailing edge 4 and a tip 2*c*. In the remainder of the text, the terms "longitudinal" or "transverse" respectively relate to the direction connecting the root 2*a* to the tip 2*c* of the blade and to the direction connecting the leading edge 3 to the trailing edge 4.

The suction face of the aerofoil 2*b* is in contact with the long rods (not visible in the figure) carried by the surface of the suction face footprint of the mold. The mold 1 is produced in three parts carried by a base: a root block 1*a*, a blade block 1*b* and a tip block 1*c* on which respectively the root 2*a*, the aerofoil 2*b* and the tip 2*c* of the core 2 rest. In the version shown, the tip block and root block are mobile relative to the base of the mold 1 to serve as ejectors of the wax model once the injection process has been carried out; the aerofoil block 1*b* is, in turn, fixed and rigidly connected to the base of the mold 1.

Figure 2:
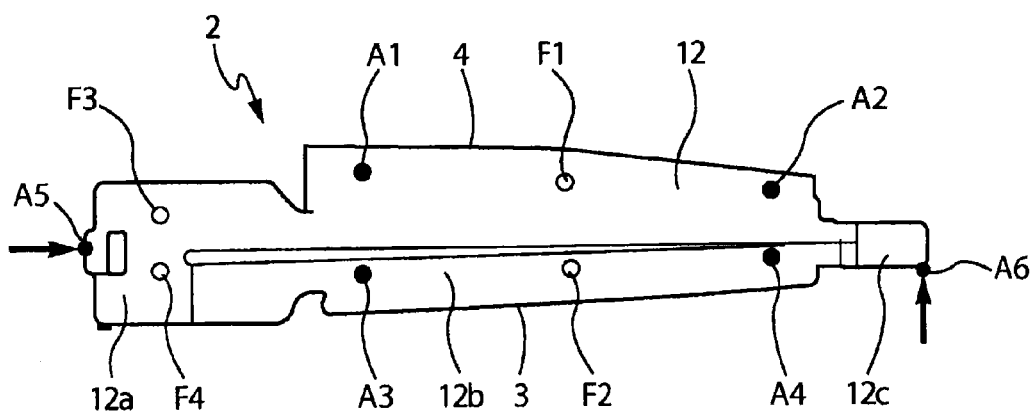
FIG. 2 is a front view of the suction face of a core designed to be placed in an injection mold according to the prior art.
Figure 3:
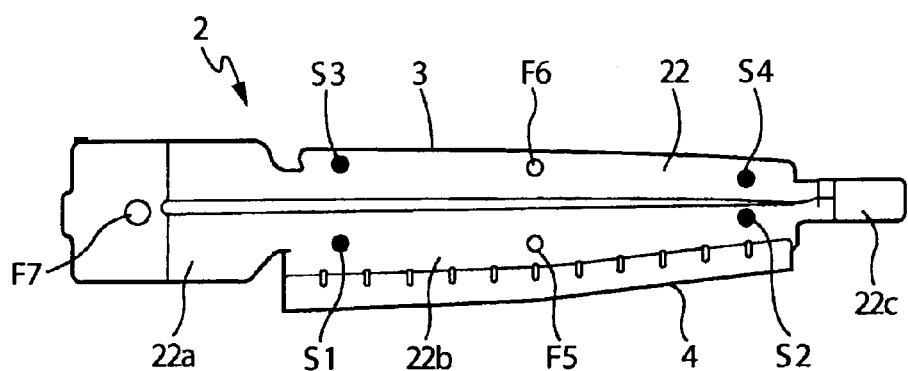
FIG. 3 is a front view of the pressure face of a core designed to be placed in an injection mold, according to the prior art.

With reference now to FIGS. 2 and 3, it is possible to see respectively the suction face 12 (with the suction face of its root 12*a*, its aerofoil 12*b* and its tip 12*c*) and the pressure face 22 (with the pressure face of its root 22*a*, its aerofoil 22*b* and its tip 22*c*) of a core 2 designed to be placed in the mold 1 according to the prior art for the injection of wax.

On the suction face 12 are shown, in the form of blacked-out circles, bearing points A1 to A6 against which the long rods extending from the lower surface of the mold 1 bear and, in the form of transparent circles, the position of false points F1 to F4 located opposite short rods which delimit the tolerance envelope for the suction face of the blade. Similarly on the pressure face are shown, in the form of blacked-out circles, clamping points S1 to S4, on which the pressure exerted by the upper surface of the mold is applied when closing said mold and the position of false points F5 to F7 located opposite short rods for delimiting the tolerance envelope for the pressure face of the blade.

In the prior art of FIGS. 2 and 3, the six bearing points are distributed in the following manner: four points A1 to A4 are positioned in the region of the upper and lower ends of the suction face of the aerofoil 12b, on the leading edge side 3 for two thereof and on the trailing edge side 4 for the two others; the two last bearing points A5 and A6 are positioned firstly on the root and secondly on the tip of the core. Said two last bearing points are oriented so as to maintain the core in abutment against the mold in the two directions of its median plane.

The false points are, in turn, positioned for two thereof F1 and F2, in the region of the center of the suction face 12 of the aerofoil 12b respectively on the side of the leading edge 3 and the trailing edge 4 as are the bearing points of the leading edge and the trailing edge which enclose them, and for the two following points F3 and F4 on the suction face of the root 12a of the core.

On the pressure face side, the four clamping points S1 to S4 are positioned opposite the four first bearing points A1 to A4, i.e. in the region of the upper and lower ends of the pressure face 22 of the aerofoil 22b, on the trailing edge side 4, for the two first ones thereof and on the leading edge side 3 for the two others. Three false points F5 to F7 are positioned on the pressure face 22 of the core, two points F5 and F6 in the center of the pressure face 22 of the aerofoil 22b transversely opposite the false points F1 and F2 of the suction face, and the third F7 on the pressure face 22a of the root 22a of the core.

Now described with reference to FIGS. 4 to 7 is the positioning of a core 2 in an injection mold 1 having long rods and short rods according to the invention.

Figure 4:
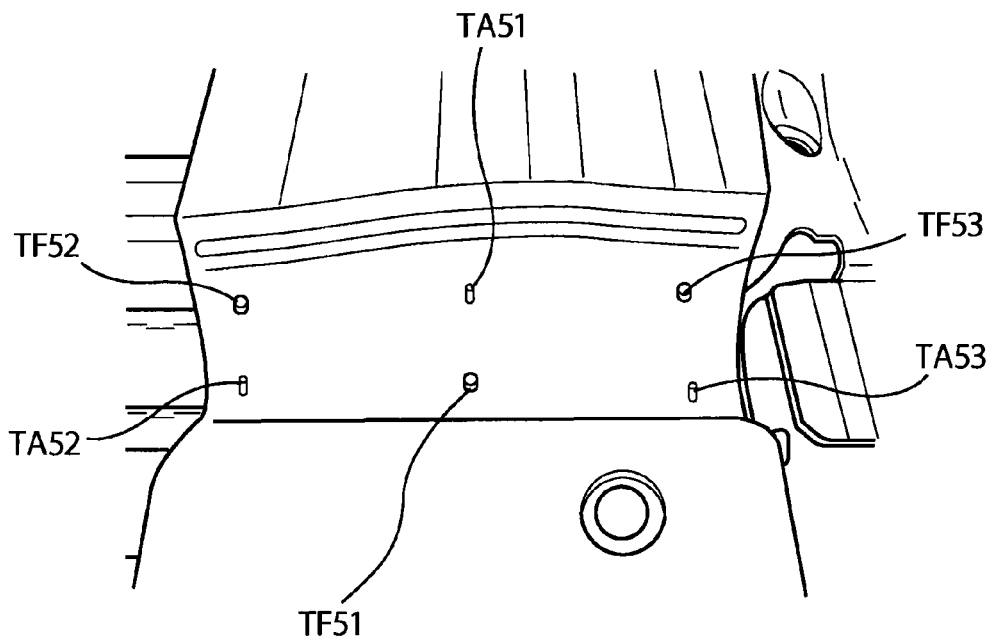
FIG. 4 is an oblique view of the suction face cavity of an injection mold according to an embodiment of the invention.

FIG. 4 shows the footprint located on the lower face of an injection mold, known as the suction face footprint, which is designed to receive the suction face of a core 2. This suction face footprint bears six rods, three long rods referenced TA51 to TA53, which are designed to come into contact with the bearing points A51 to A53, on the suction face of the core 2 and three short rods, referenced TF51 to TF53, which are designed to monitor the thickness of the wall of the blade in the region of the three false points F51 to F53 on the core 2.

Figure 5:
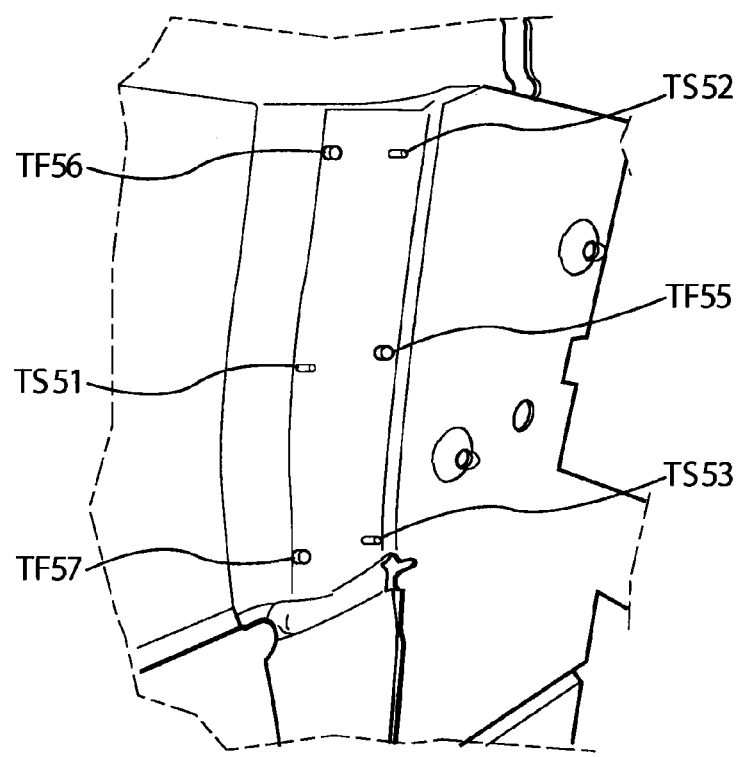
FIG. 5 is an oblique view of the pressure face cavity of an injection mold according to an embodiment of the invention.

Similarly, FIG. 5 shows the footprint located on the upper face of the injection mold. Said pressure face footprint in turn carries six rods, three long rods TS51 to TS53, and three short rods TF55 to TF57, corresponding to three clamping points S51 to S53, and three false points F55 to F57, on the pressure face of the core 2.

The long rods have a relatively reduced diameter as their ends are in contact with the surface of the core and the presence of said long rods is manifested as a hollow tube in the wax model of the blade. It is necessary, therefore, to minimize this interference which is present between the core and the long rods, by the greatest possible reduction of the diameter thereof. In contrast, the purpose of the short rods is to oppose the resistance when closing the mold, if the core is badly positioned. The diameter thereof is thus greater than that of the long rods.

Figure 6:
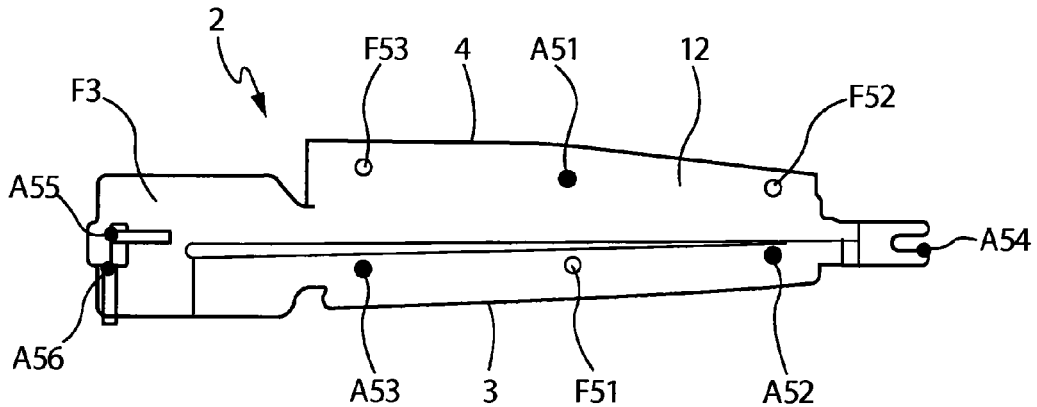
FIG. 6 is a front view of the suction face of a core designed to be placed in an injection mold according to an embodiment of the invention.
Figure 7:
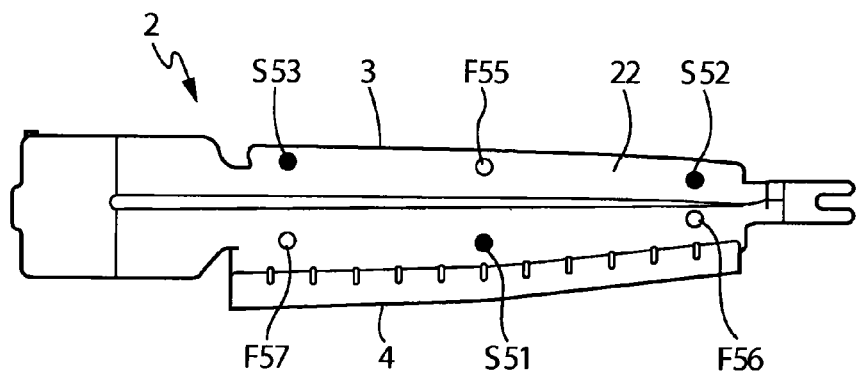
FIG. 7 is a front view of the pressure face of a core designed to be placed in an injection mold according to an embodiment.

With reference to FIGS. 6 and 7, the positioning of the long rods of the mold 1 is defined so that the aerofoil 2b has only three bearing points A51 to A53, and three clamping points S51 to S53, the three other bearing points A54 to A56 being transferred to the root 2a and the tip 2c of the core.

The long rods of the mold are positioned such that three bearing points on the suction face side are located on the trailing edge side 4, for the first A51 positioned in the center of the suction face 12 of the aerofoil 12b, and on the leading edge side 3, for the following A52 and A53 in the region of the upper and lower ends of the aerofoil 12b of the core. The clamping points S51 to S53 are positioned on the pressure face 22 of the core opposite said three bearing points. Alternatively, a symmetrical positioning could also be implemented with the point A51 located on the leading edge side, and the points A52 and A53 located on the trailing edge side.

The three last bearing points A54 to A56 are positioned on the faces of the core which are transverse to the median plane thereof, so as to come into abutment with the mold 1 and correctly position the core by translatory movements in said median plane.

False points F51 to F53 for the suction face 12 and F55 to F57 for the pressure face 22 are also positioned on the aerofoil 2b of the core 2. On the suction face 12 and on the pressure face 22, they are positioned longitudinally in the same region as the bearing points or clamping points on the aerofoil i.e. in the center thereof and at its two ends, but on the trailing edge side or leading edge side which does not already have a bearing point or clamping point. These false points are positioned in a so-called staggered manner relative to the bearing points for the suction face side, and relative to the clamping points for the pressure face side.

Figure 8:
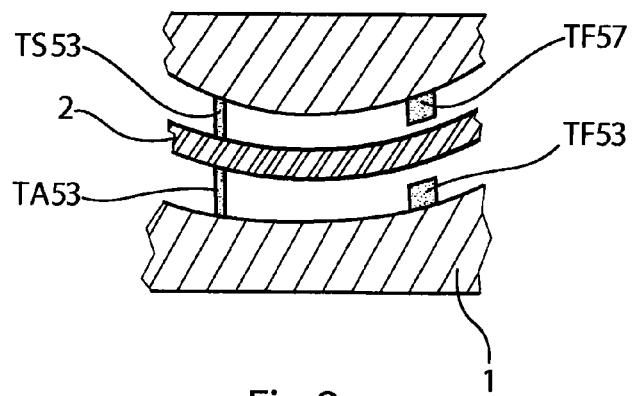
FIG. 8 is a sectional view of the core of FIG. 1 and of the injection mold, taken in the region of one of the bearing points and one of the false points.

With reference now to FIG. 8, a core 2 is seen in section in position in an injection mold 1. The core is held in place in the mold, amongst other things, by a pair of long bearing rods TA53 and TS53 and it has two short rods TF53 and TF57 which do not come into contact with the surface of the core, said core being correctly positioned in the mold. It is observed that the ends of the long rods are profiled so as to be adapted to the shape of the core in the region of its corresponding bearing points. Similarly, the ends of the short rods are profiled so as to reproduce the shape of the core in the region of its false points which the short rods are liable to touch. Thus the core is prevented from being marked when the mold is closed if the core is not correctly positioned.

The relevance of the invention for the strength of the core 2 when positioned in the mold 1 or during the injection of wax may be explained as follows:

The leading edge 3 of the core 2 is positioned and clamped at its upper and lower ends and the trailing edge 4 is only positioned and clamped by a single point which is located in the center of said trailing edge. This permits the core to be centered in the most appropriate manner in the wax. The core 2 is thus less subjected to stress in the injection mold, as the trailing edge 4 at its ends has greater freedom to be freely positioned.

The aerofoil 2b of the core 2 is positioned by only three points, clamped by the long rods TA51 to TA53 and TS51 to TS53 between, on the one hand, the bearing points A51 to A53 for the suction face and, on the other hand, the clamping points S51 to S53 for the pressure face, which provides it with an isostatic positioning. This results in an absence of flexural tension or twisting which would generate stresses in the core and, as a result, the risk of breakage or poor positioning in the mold 1; this prevents the appearance of faults in the thickness of the walls defining the internal cavities of the blade produced after casting.

By modifying the arrangement, on the one hand, of the bearing points on the suction face 12 and, on the other hand, of the clamping points on the pressure face 22 of the core 2, in addition to the position of the bearing points at the root 2a and the tip 2c of the core, the distribution of stresses which are applied to the core 2 is modified when the core is positioned and clamped in the injection mold 1. By being subjected to less stress, the core deforms less when the mold 1 is opened after the injection process and also deforms less when wax is removed from the shell. The wall thicknesses on the cast metal part are thus more carefully maintained.

The invention has been described by positioning a bearing point on the trailing edge of the suction face and two bearing points on its leading edge; it is obvious that the positioning may be carried out in a symmetrical manner with a bearing point on the leading edge side and two bearing points on the trailing edge. The positioning of the clamping points on the pressure face is thus adapted, as a result. Similarly, the description has been made with the suction face side arranged on the lower face of the mold and having the bearing points; the invention could also be implemented if the pressure face were placed against the lower face of the mold and its long support rods.

The invention claimed is:

1. An injection mold for producing a model of a turbine engine blade to be produced by a lost wax casting technique, comprising:
    an upper face that folds onto a lower face, the two faces including a footprint reproducing an external shape of the blade to be produced and carrying long rods for supporting a core configured to generate cooling cavities inside the blade, the core having a shape of an aerofoil between a root and a tip and extending within a predetermined clearance envelope in a case of deformation of the core, the long rods of the lower face configured to come into contact with a first face of the aerofoil in a region of bearing points and the long rods of the upper face configured to come into contact with a second face of the aerofoil in a region of clamping points, each clamping point of the second face being positioned opposite a bearing point of the first face;
    at least one short rod extending from one of the faces of the mold and pointing toward a false point positioned on one of the faces of the aerofoil, a length of the short rod being less than a distance between a face of the mold and that of the aerofoil in a region of the false point and a difference between the length and the distance being equal to a tolerance at a position of the false point.

2. The injection mold as claimed in claim 1, in which a number of pairs of a rod associated with a bearing point on the first face and a rod associated with a clamping point on the second face of the aerofoil of the core is at most equal to 3.

3. The injection mold as claimed in claim 2, in which the pairs of long rods are associated with bearing points on the first face and with clamping points on the second face, positioned for a first pair in a region of a center of the aerofoil, on a trailing edge side, and for two other pairs in a region of the upper and lower ends of the aerofoil on a leading edge side.

4. The injection mold as claimed in claim 2, in which the pairs of long rods are associated with bearing points on the first face and with clamping points on the second face, positioned for a first pair in a region of a center of the aerofoil on a leading edge side, and for two other pairs in a region of upper and lower ends of the aerofoil on a trailing edge side.

5. The injection mold as claimed in claim 1, in which the short rod is positioned longitudinally in a region of one of the bearing points or clamping points of one of the faces of the aerofoil, and transversely on a leading edge side or trailing edge side opposing that on which the bearing point or clamping point is positioned.

6. The injection mold as claimed in claim 5, in which the short rods point toward three false points of a same face, the false points being positioned in a staggered manner relative to the bearing points or clamping points of the same face.

7. The injection mold as claimed in claim 6, in which the short rods point toward three false points on each of the faces of the aerofoil of the core, the false points being positioned on each face in a staggered manner relative to the bearing points or clamping points.

8. The injection mold as claimed in claim 1, in which the rods are of cylindrical shape, having ends following a local shape of the core.

9. The injection mold as claimed in claim 6, in which the short rods have a greater diameter than that of the long rods.

10. The injection mold as claimed in claim 6, in which the short rods have a length which is shorter by $5/100$th of a millimeter than that of the long rods.

* * * * *

UNITED STATES PATENT AND TRADEMARK OFFICE
CERTIFICATE OF CORRECTION

| | | |
|---|---|---|
| PATENT NO. | : 8,708,029 B2 | Page 1 of 1 |
| APPLICATION NO. | : 13/824754 | |
| DATED | : April 29, 2014 | |
| INVENTOR(S) | : Pourfilet et al. | |

It is certified that error appears in the above-identified patent and that said Letters Patent is hereby corrected as shown below:

In the Specification

Column 5, line 39, change "pressure face 22a" to --pressure face 22--.

Signed and Sealed this
Seventh Day of October, 2014

Michelle K. Lee
*Deputy Director of the United States Patent and Trademark Office*